Aug. 8, 1933.                T. W. PAUL                 1,921,581
                            HITCH MECHANISM
                        Filed Feb. 20, 1931        2 Sheets-Sheet 2
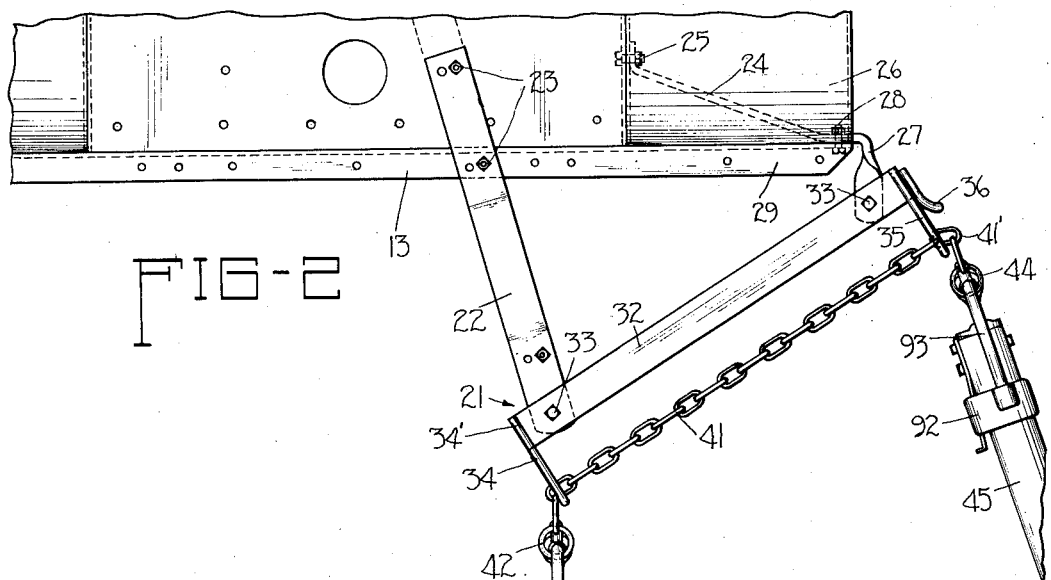
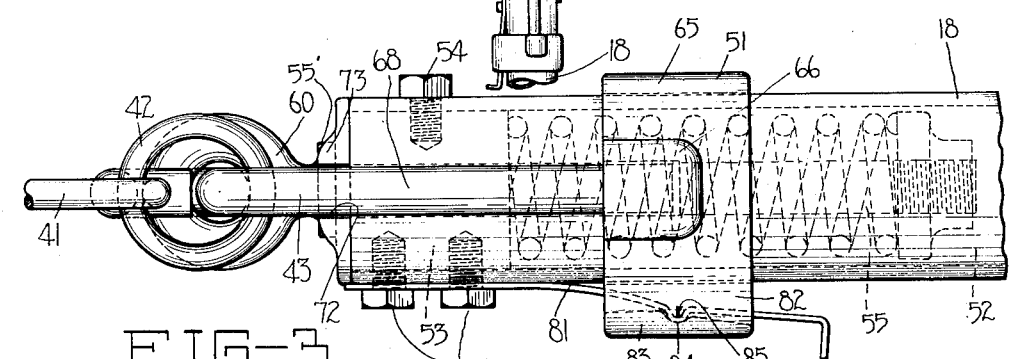
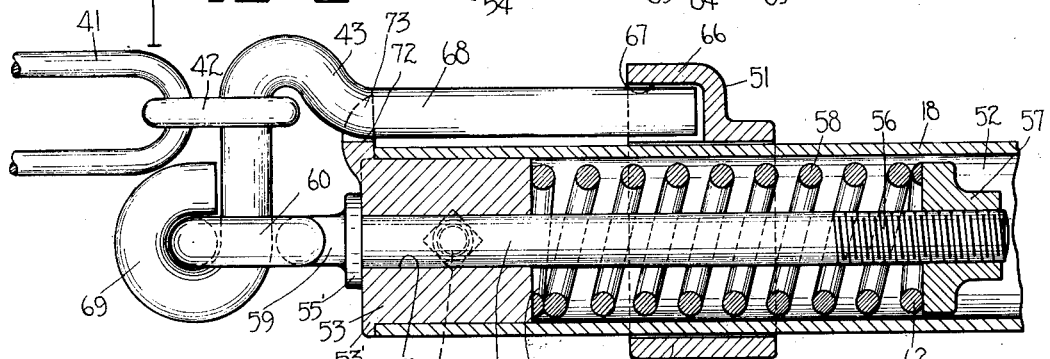
INVENTOR
Talbert W. Paul
BY Brown, Jackson
Boettcher & Diemer
ATTORNEY
WITNESS
Walter Ackerman Patented Aug. 8, 1933

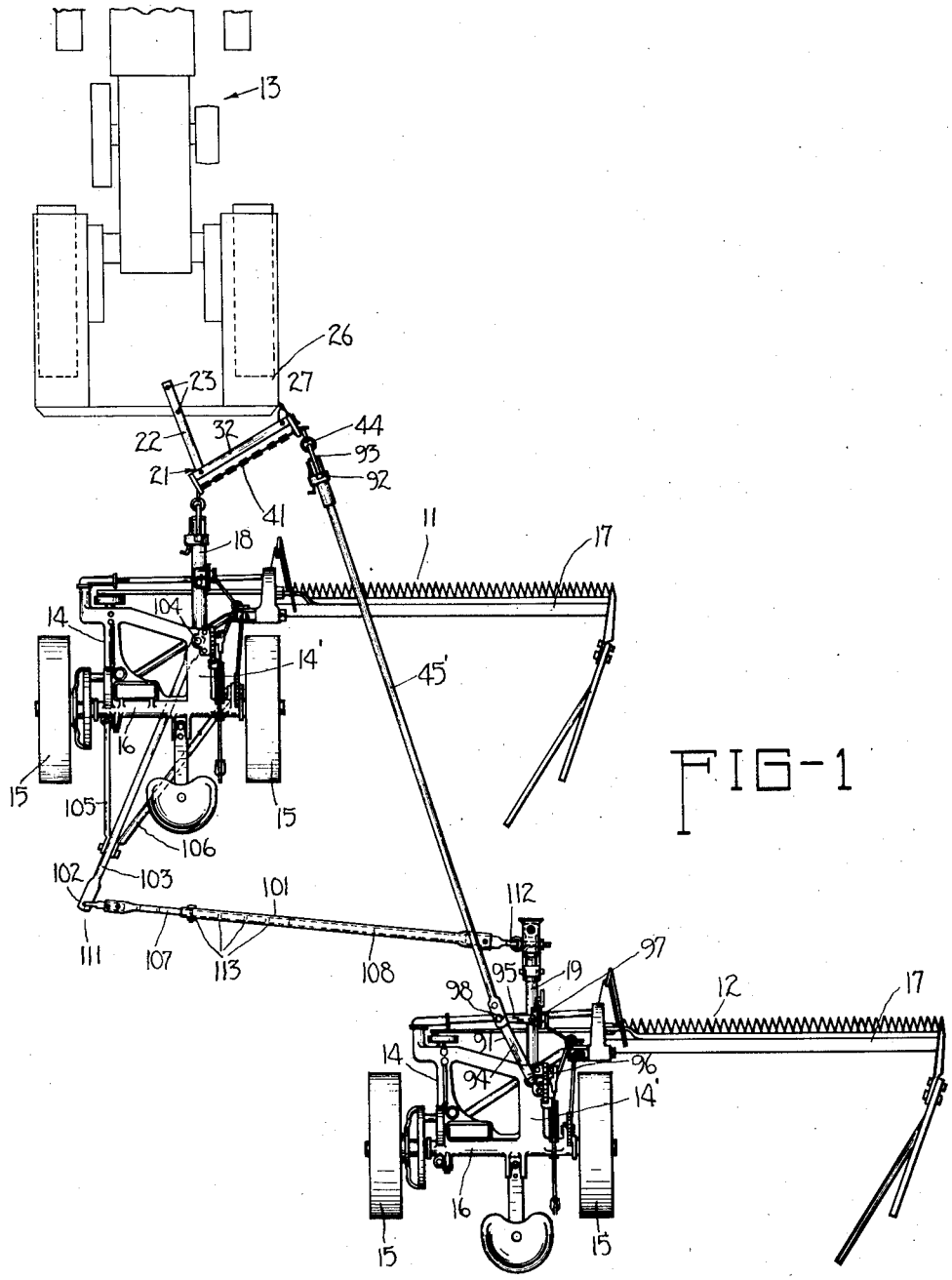

1,921,581

UNITED STATES PATENT OFFICE 1,921,581

HITCH MECHANISM

Talbert W. Paul, Moline, Ill., assignor to Deere & Company, Moline, Ill., a Corporation of Illinois Application February 20, 1931. Serial No. 517,169

16 Claims. (Cl. 280—33.44)

This invention relates to improvements in hitch mechanisms for operatively pulling two or more working units from a motive source or draft vehicle. It is often desirable to employ two or more cultivating or harvesting implements drawn by a tractor or other motive source. One particular illustration of this is in the drawing of two mowers by a single tractor with the mowers positioned in tandem offset relation to the tractor, so that both implements can be operated simultaneously to double the work accomplished.

When hitching one mower to a tractor it is often desirable to provide a safety device in the form of a release in the draft connection of the implement so that the forward movement of the implement can be stopped immediately on encountering an obstacle. In connecting two such implements directly to a tractor by separate and independent draft connections with a safety release device in each draft connection, the second implement being drawn by the tractor might run into and damage the first implement when the latter is released from forward draft upon contacting an obstacle before the operator stopped the tractor. On the other hand, when the rear implement disengages itself upon striking an obstruction, the tractor with the first implement would be moved forwardly a considerable distance before the tractor could be stopped. This would then necessitate backing of the tractor and first mower to again connect the released mower to the tractor. The above method of hitching two implements to a tractor would obviously be inconvenient and impractical in operation.

The rear implement might also be connected to the first implement and only one safety release device employed in the draft connection of the first implement. The safety release device would then have to transmit draft to both implements and yet be sensitive enough to release when either implement encountered an obstruction. This method of hitching two implements to a motive source has proved unsatisfactory because the safety release device would have to be unusually sensitive and subject to fine adjustment to meet divers operating conditions.

I have therefore provided a novel arrangement whereby two or more implements may be connected to a motive source without the disadvantages mentioned above. The invention provides for hitching a plurality of implements to a tractor in such a manner that when any one of the implements becomes released from forward draft, all the implements will be instantly released.

Another feature of my invention is the provision of an improved hitch arrangement whereby two implements may be drawn in tandem offset relation by a tractor or other motive source, so that each implement will be accurately steered to be maintained in proper working relationship.

Another feature of my invention is the provision of an improved safety release device in the draft connection of the implements so that the forward draft will be interrupted instantly upon either implement contacting an obstruction.

Other objects and advantages of my invention will become apparent to one skilled in the art from the following description of my invention, taken in conjunction with the accompanying drawings, in which:

Figure 1 is a plan view showing my invention as adapted to a conventional tractor and mowers;

Figure 2 is an enlarged fragmentary plan view showing the preferred embodiment of my invention;

Figure 3 is an enlarged fragmentary top view of my novel release mechanism; and

Figure 4 is a vertical fragmentary view, in section, taken approximately through the longitudinal center of Figure 3.

Referring now to the drawings, Figure 1 discloses two working units drawn by a tractor. The working units may be of any type of implement within the broad aspects of my invention, but for purposes of description the preferred embodiment of my invention is disclosed in conjunction with two mowing machines 11 and 12 drawn by a tractor 13.

The mowing machines 11 and 12 are of known construction; each comprises a frame 14 supported by wheels 15 mounted on opposite ends of the horizontal axle 16. Each implement has a conventional sickle bar 17 extending laterally from the frame 14. The draft tongues 18 and 19 extend forwardly from the implements and are mounted below the longitudinal frame member 14'.

As best seen in Figure 2, the tractor 13 has a draw frame 21 which provides the support to which the implements are connected. This draw frame 21 comprises a draft member 22, one end of which is connected to the rear tractor platform as by bolts 23 and the opposite end extends rearwardly of the tractor. A strap 24 is secured beneath the fender 26, and one end of the strap is bolted at 25 to the tractor frame while the other end 27 projects around the outer edge of the fender 26 and is bolted as at 28 to the inside of the fender and angle iron 29. The free end 27 of the strap is bent at right angles and extends rearwardly from the tractor. A connecting strap 32, which completes the frame, is bolted on the free ends of the members 22 and 24 as by bolts 33.

A pair of connecting members 34 and 35 are fixed on the ends of the bar 32 and they consist of rings, each formed of a single piece of bar looped back upon itself to provide a pair of parallel legs 34' which legs straddle and are welded on the bar 32. The member 35, in addition, has a lug or finger 36 shown curved away from the member 35. This lug 36 consists of a short piece of metal welded or otherwise secured to the side of member 35, the curved end of this finger 36 extending into the area circumscribed by the looped ring portion of member 34.

A chain 41 is threaded through these ring members 34 and 35. The end 42 of the chain which passes through the ring 34 is connected to the draft tongue 18 of the front mower while the opposite end 44 of the chain 41 is connected to the long diagonal draft member 45 which is secured to the rear mower 12.

To facilitate hitching the draft members 18 and 45 to the tractor, the chain is threaded through the rings 34 and 35, the first mower's draft tongue 18 is then connected to the end 42 of the chain, and an intermediate link 41' near the opposite end of the chain is hooked on to the lug or finger 36 to hold the chain 41 under tension and thereby support the tongue 18 until the draft member 45 can, in turn, be connected to the end 44 of the chain. Forward movement of the tractor will cause the link 41' to be pulled from the plug 36 due to the load of the rear mower 12.

Now referring more particularly to Figures 3 and 4, a safety release device 51 is employed in the draft connection of the front implement. This safety release device 51 is mounted in the tubular tongue and allows the implement to be instantly released upon its encountering an abnormal obstruction or load. This result is due to the particular arrangement employed and the improved trip device which is now to be described.

The draft tongue 18 has a central longitudinal bore 52, the end of which is closed by a cylindrical block 53. The cylindrical block 53 has a peripherally flanged end 53' and is held in the bore 52 by bolts 54 which are threaded through the tongue 18 and into the block 53. The tongue forms an enclosed housing for the compression spring of the device and dirt and rain are prevented from entering the end of the tongue due to the snug relationship of the block 53 in the end of the bore 52. A draft member in the form of a bolt 55 passes longitudinally through a cylindrical opening 56 in the block 53 and a peripherally flanged portion 55' abuts the exterior end of the block to limit the inward movement of the bolt 55. The flanged portion 55' converges into a neck 59 which neck, in turn, is integrally formed with an eye 60. The opposite end of the bolt 55 is threaded, as at 56, to receive a flanged member or nut 57. A compression spring 58 is mounted on the bolt 55, and the ends thereof abut against the inner side of the block 53 and against the flared portion or wall of the nut 57.

A peripheral sleeve 65 is mounted exteriorly of the draft member 18 and is adapted to slide longitudinally thereon. A raised portion or boss 66 forms a pocket 67 for receiving one end of an arm 68. The opposite end of the arm 68 is bent downwardly, as seen in Figure 4, through the eye 60 of the bolt 55 and encircles one side thereof as at 69.

The cylindrical block 53 has an upwardly extending portion 71 formed with an arcuate recess 72 therein for receiving an intermediate portion of the arm 58 to aid in holding the latter in normal operative position.

The sleeve 65 is restrained from free longitudinal movement by a spring finger 81 which passes through a channel or slot 82 in an enlarged side portion 83 of the sleeve. One end of the spring finger 81 is secured beneath the heads of the bolts 54 on the tongue 18. The channel or slot has a depression 84 in which a stop 85 on the spring finger engages. The spring finger, passing longitudinally through the slot 82, prevents the sleeve from turning relative to the tongue 18, but the sleeve 65 may be moved longitudinally of the draft tongue upon release of the detent 85 from the depression 84.

To hitch the draft tongue 18 to the tractor, the end link 42 of the chain 41 is passed over arm 43 and the link 42 is normally hooked in the bent portion of this arm. In ordinary operation, the compression spring 58 can resist the usual draft transmitted therethrough, but when an unusual obstacle or load is encountered by the mower, the spring will be compressed to such an extent that the arm 43 will be withdrawn from the pocket 67 and consequently release the chain 41 to instantly interrupt the application of draft to the front implement 11. Draft to the second implement 12 will automatically be discontinued due to the chain being instantly pulled through the ring connectors 34 and 35 by the load of the rear implement exerted through the member 45. In the preferred embodiment herein shown, I employ one such safety release device in the draft connection of each implement, one mounted in the draft member 18 as just described and a similar release device mounted at the end of draft member 45. In like manner should the cutter bar on the rear mower encounter an unusual obstacle that implement will instantly stop due to the releasing of the chain 41 from the draft member 45, and forward draft of the front implement will necessasrily be stopped due to the chain being pulled through the looped connectors 34 and 35. However, it is to be understood that only one release device may be employed of such construction that either implement might trip the device to produce the desired result, such arrangement being within the scope of my invention.

Referring to Figure 1, it will be observed that I have illustrated the present invention as embodied in a draft connection serially connecting two mowers, which draft connection is so supported on or connected with the tractor that both mowers will be disconnected from the tractor should either of them be subjected to an overload. As illustrated, therefore, the draft connection is adapted to transmit substantially equal loads to the trailing implements, the release mechanisms disposed between the ends of the chain 41 and the front ends of the draft members 18 and 45' being substantially identical and therefore adapted to be released upon the transmission of substantially the same overload. It is important to observe that as long as the loads transmitted to the implements are substantially the same there will be no shifting of the chain 41 in the loops 34 and 35. However, should the loads on the mowers be unequal then all that will occur will be the shifting of the chain 41 until the arm 43 abuts against the loop 34 or the arm 93 abuts against the loop 35. It therefore follows that the present invention is not necessarily limited to the transmission of substantially equal loads, but that unequal loads can be transmitted with equal facility. The arms 43 and 93 therefore serve as stop means limiting the shifting of the connection between the two implements relative to the tractor so that either equal or unequal loads can be propelled so long as the connection is intact and is not interrupted by the tripping of the overload release means. In either case, therefore, should the release mechanism for either implement be tripped the release arm, 43 or 93, will be released from its ring, 42 or 44, and this will be followed by the withdrawal of the chain 41 from both loops 34 and 35, thereby releasing both implements. In such cases where the loads are not equal or substantially so, it may be desirable to have one of the release mechanisms adjusted to transmit a greater load, without tripping, than the other, and such is contemplated by the present invention. It is also to be understood that instead of separate release mechanisms, one for each implement, a single release mechanism may be utilized by disposing the same somewhere adjacent the intermediate portion of the chain and so constructed that when it is tripped both ends of the chain will be withdrawn from the loops 34 and 35. In this case, as well as in the structure described above, as soon as either of the implements is subjected to a predetermined overload, both implements are immediately and simultaneously released from the tractor or pulling vehicle. Also, where an intermediate release mechanism is disposed between the ends of the chain 41, should one of the implements create a greater draft resistance than the other, the only thing that will occur will be the shifting of the chain 41 with respect to the draft frame until one end of the draft member for the other implement contacts with one of the loops, 34 or 35, this condition in no wise effecting the release of both implements by the tripping of the intermediate release mechanism.

Broadly considered, therefore, as long as the continuity of connection between the two implements is maintained the shifting of the flexible chain 41 under unequal load conditions is limited by the connections between its ends and the draft members of the two implements, and by virtue of this construction either unequal loads or equal loads can be transmitted to the two implements with equal facility and, if desired, the individual release mechanisms may be constructed or adjusted to accommodate such unequal loading, or release mechanisms of different character to accommodate different loads may be incorporated if desired.

Referring again to Figure 1 of the drawings, I have shown my novel draft mechanism arranged whereby the two mowing machines are drawn in staggered relation. The second implement is so positioned that the inner end of its sickle bar travels approximately directly behind the outer end of the sickle bar of the first implement, thereby cutting a swath approximately double the width of a single implement.

The draft connection which transmits draft to the rear implement 12 comprises the diagonal rod 45 pivotally mounted on a bracket structure above the rear mower 12. The forward end of this rod is preferably provided with the safety release mechanism 92, as before mentioned, and likewise has an arm 93 which receives the end link 44 of the chain 41. The rod 45 extends in an inclined diagonal direction above the rear implement 12, and is pivotally supported on a bracket structure 91. The bracket structure 91 consists of a vertically inclined member 94 and a brace 95. The inclined member 94 is bolted at 96 on the longitudinal frame portion 14' and the brace 95 is bolted at 97 on the draft tongue 19. The inclined member 94 and brace 95 converge at a point above and to the left of draft tongue 19, and provide a base 98 on which the rod 45 is pivoted.

The direction of movement of the rear implement 12 is controlled by the front implement 11 through a steering link 101 which is pivotally connected to the forward end of the draft tongue 19, and pivotally supported at a point 102 in the rear and somewhat to the left of the frame 14 of the front implement 11. This point of connection is preferably provided by an outrigger bar 103 bolted to the frame 14' at 104, and supported by brace rods 105 and 106 which brace rods are fixed to the frame 14.

The steering link 101 consists of a telescopic section 107 which slides longitudinally into a sleeve 108. The section 107 is pivotally connected at 111 to the extreme end of bar 103 and the sleeve 108 is pivotally connected to an eye bolt 112 on the draft tongue 19. A number of alined openings 113 pass diametrically through the section 107 and sleeve 108 and a bolt 114 is secured in one of these openings 113 to maintain the telescopic section in any one of a number of longitudinally adjusted positions.

Due to the adjustability of the steering link 101, the rear mower may be positioned laterally at various points to accommodate different lengths of sickle bars employed on the front mower, or this adjustment may be utilized to adapt it to other conveniences in operation.

The rear mower will have the tendency to veer to the left in normal straightaway operation on account of the diagonal direction of draft from the rod 45, but the transverse relation of the steering link 101 will counteract this tendency by pushing the draft tongue 19 to the right, the steering link at this time having a compression force therein. If the rear implement has the tendency to swerve to the right the steering link 101 will exert a pull or be under tension to prevent any such movement.

In turning to the right or left the front implement 11 will closely follow the tractor in similar turning movement but the rear implement will have an opposite turning reaction. That is, in turning to the right the rear implement will, at the outset, swing to the left due to the pivotal attachment of the steering link 101 at a point to the rear of the supporting wheels 15 of the front mower. This reaction will be but momentary, however, as continued turning of the front mower will draw on the diagonal member 45 to cause the rear mower to swing back to the right to thereafter follow in normal offset relation to the first implement. In this manner the sickle bar on the rear implement will move laterally to the left, or into the area previously cut by the first mower, for a sufficient distance to prevent a strip of uncut grain being left standing due to being passed between the sickle bars. Thus, on turning to the right, the steering link 101 will momentarily be under tension, and subsequently, for the greater part of the turn, be under compression.

In turning to the left, the opposite reaction takes place, that is, the first implement will turn to the left giving the rear implement an impulse to momentarily swing to the right, followed by a counter force exerted through the diagonal draft member 45 which will make the rear implement turn to the left to regain its normal offset position relative to the front implement. Turning to the left will result in the steering link 101 first being under compression for a short period of time, and subsequently being under tension for a much greater interval of time.

The particular draft arrangement, which I employ, thus holds the first implement 11 in an offset position relative to the tractor, while the draft member 45 and the steering link 101 cooperate to maintain the rear implement 12 in a staggered offset position relative to the first implement 11 and the tractor 10.

I have disclosed my invention as associated with a tractor and two mowers, but, however, it is to be understood that I am not to be limited thereby, for an adaptation of my invention may equally well be employed with any type of pulling vehicle or motive source and any type of working trailer, and still be within the spirit of my invention and scope of the appended claims.

What I claim is:—

1. The combination with two working units adapted to be drawn in tandem offset relation to each other behind a pulling vehicle, of mechanism for transmitting draft to said units comprising a pair of releasable mechanisms for automatically releasing both of said units when either encounters an abnormal load of substantially the same magnitude.

2. The combination with two working units adapted to be drawn in tandem offset relation to each other behind a pulling vehicle, of a pair of releasable mechanisms for transmitting draft independently to each of said units, and a movable connection between said mechanisms and vehicle and actuated by means in the draft connection of one unit to interrupt the forward draft of both units instantly upon either unit encountering an abnormal load of substantially the same magnitude.

3. The combination with a source of power and two working units adapted to be drawn thereby in tandem offset relation to each other behind a pulling vehicle, of separate releasable mechanisms for transmitting draft independently to each of said units, and an equalizing connection transmitting draft from said source of power to said mechanisms and adapted, upon one of said units contacting an obstruction and the subsequent release of the associated releasable mechanism, to simultaneously stop the forward draft of both units.

4. The combination with two working units adapted to be drawn in tandem offset relation to each other behind a pulling vehicle, of mechanisms for transmitting draft independently to each of said units, a flexible connection shiftably and detachably connected with the pulling vehicles, and trip means individually connecting each of said units with said flexible connection and imposing the draft reactions of said units on said flexible connection, whereby the trip means of either unit is adapted to interrupt the forward draft of both units.

5. The combination with two implements adapted to be drawn in tandem offset relation to each other behind a tractor, of draft members interposed between said implements and said tractor, a chain releasably connected with each of said members, and also releasably connected with said tractor, said chain operable upon being released from one of said implements to automatically be released from said tractor to stop the forward movement of the other of said implements.

6. The combination with two implements adapted to be drawn in tandem offset relation to each other behind a tractor and adapted to impose substantially equal loads thereon, of draft members interposed between said implements and said tractor, a chain releasably connected to each of said implements, and a ring on said tractor for detachably receiving said chain, said chain adapted to be disconnected from one of said implements when the latter encounters an obstruction and simultaneously withdrawn from said attaching ring to instantly stop the forward draft to the other of said implements.

7. The combination with two implements adapted to be propelled by a tractor, of draft members connected with said implements, a draft frame on said tractor, means for securing said draft members to said draft frame and comprising a chain, attaching means on said frame for shiftably receiving the intermediate portion of said chain, whereby the draft load of one implement is balanced against the draft load of the other implement and a releasable mechanism in the end of each of said draft members and adapted to be connected near the ends of said chain, whereby said chain is released from either of said draft members when an abnormal load is transmitted therethrough and simultaneously pulled from said attaching means to free the other implement from the tractor.

8. The combination with two implements positioned one behind the other in tandem offset relation and drawn by a tractor, a looped member on said tractor, a chain loosely held in said looped member and capable of being withdrawn therefrom, the opposite ends of said chain adapted to be secured to the forward ends of said draft members, and a hook associated with said looped member for temporarily holding said chain under tension when only one end of said chain is hitched to one of said draft members, whereby hitching of the opposite draft member is facilitated, said chain being released from said hook upon forward draft of said tractor being applied to both implements.

9. The combination with two implements drawn by a tractor, of draft members interposed between each of said implements and said tractor, a safety release device in each of said draft members and comprising a yielding means adapted to have draft transmitted therethrough, and a trip device associated with said yielding means and connected to said tractor for transmitting normal draft therethrough, said trip device actuated by said yielding means when the latter is subjected to an abnormal load to interrupt forward draft of both of said implements, and draft means connected with the tractor for transmitting draft to said draft members through said release devices, said draft means being shiftable with respect to the tractor so that the effectiveness of the transmission of draft to either implement is dependent upon the uninterrupted transmission of draft to the other implement.

10. The combination with a plurality of working units adapted to be propelled by a pulling vehicle, of mechanism for transmitting draft to said units comprising an overload release mechanism connected with each unit and draft means connected with all of said release mechanisms and shiftably connected with the pulling vehicle to impose the draft reactions of the units one on the other, whereby the effectiveness of the transmission of power to each of the units is dependent upon the transmission of power to all of them.

11. The combination with two working units adapted to be propelled by a pulling vehicle, of mechanism for transmitting draft to said units comprising an overload release mechanism for each unit and means shiftably connected with the pulling vehicle and disposed in draft transmitting relation with both release mechanisms for substantially balancing the draft reaction of each unit against the draft reaction of the other unit, either implement being released upon predetermined shifting movement of said means relative to the pulling vehicle following the release of the overload mechanism of the other unit under an abnormal load imposed thereon.

12. The combination with two implements adapted to be propelled by a tractor, of draft members connected with said implements, means serving as a draft frame on the tractor, means for securing said draft members to said draft frame and comprising a flexible member including interconnected overload release mechanism and having its ends connected, respectively, with said draft members and its intermediate portion shiftably and releasably engaged with said draft frame, the release of said mechanism disconnecting said member and releasing both end portions thereof from the draft frame to provide for the release of both implements should either of them be subjected to an overload.

13. The combination with two implements adapted to be propelled by a tractor, of draft members connected with said implements, and means shiftable with respect to the tractor and connected at its extremities with said implements, said means including overload relief mechanism interposed therein and adapted when released to interrupt the connection established by said means and to free said means from the tractor to thereby release both implements from the tractor.

14. The combination with two implements adapted to be propelled by a tractor, of draft members connected with said implements, and a connection extending from one implement to the other and serially connecting them, said connection including at least one overload release mechanism, the connection being supported on the tractor so as to be released therefrom when the connection is disconnected from either implement.

15. The combination with two implements adapted to be propelled by a tractor, of draft members connected with said implements, and a connection shiftable with respect to the tractor and extending from one implement to the other to serially connect them, said connection including at least one overload release mechanism, the connection being supported on the tractor so as to be released therefrom when the connection is disconnected from either implement, and stop means to limit the shifting of said connection as long as said connection is intact, whereby unbalanced loads are accommodated.

16. The combination with two implements adapted to be propelled by a tractor, of draft members connected with said implements, and a connection shiftable with respect to the tractor and extending from one implement to the other to serially connect them, said connection including at least one overload release mechanism, the connection being supported on the tractor so as to be released therefrom when the connection is disconnected from either implement, and means serving as stop means adjacent the ends of said shiftable connection for limiting the shifting thereof in either direction as long as said connection is intact, whereby unbalanced loads are accommodated.

TALBERT W. PAUL.